United States Patent
Solland (10) Patent No.: US 8,085,963 B2
(45) Date of Patent: Dec. 27, 2011

(54) COMBINED POWER AND AUDIO DOCK FOR HANDHELD DEVICE

(75) Inventor: Kurt Solland, Westlake Village, CA (US)

(73) Assignee: Harman International Industries, Incorporated, Northridge, CA (US)

(*) Notice: Subject to any disclaimer, the term of this patent is extended or adjusted under 35 U.S.C. 154(b) by 946 days.

(21) Appl. No.: 12/036,159

(22) Filed: Feb. 22, 2008

(65) Prior Publication Data
US 2008/0273734 A1    Nov. 6, 2008

Related U.S. Application Data

(60) Provisional application No. 60/891,126, filed on Feb. 22, 2007.

(51) Int. Cl.
*H04R 9/06*    (2006.01)
*H04R 1/02*    (2006.01)

(52) U.S. Cl. .......... 381/334; 381/87; 381/333; 381/335; 381/336

(58) Field of Classification Search .................... 381/87, 381/333–336
See application file for complete search history.

(56) References Cited

U.S. PATENT DOCUMENTS

| 7,564,678 | B2* | 7/2009 | Langberg et al. ........ 361/679.01 |
| 7,783,070 | B2* | 8/2010 | Fadell et al. ................... 381/384 |
| 2004/0224638 | A1* | 11/2004 | Fadell et al. ................. 455/66.1 |
| 2005/0014536 | A1* | 1/2005 | Grady ............................ 455/573 |
| 2005/0265569 | A1* | 12/2005 | Langberg et al. ............. 381/334 |
| 2006/0221776 | A1* | 10/2006 | Roman et al. ..................... 369/1 |
| 2008/0025544 | A1* | 1/2008 | Maldonado ................... 381/334 |

* cited by examiner

*Primary Examiner* — Anh Mai
*Assistant Examiner* — Mangtin Lian
(74) *Attorney, Agent, or Firm* — The Eclipse Group LLP (57) ABSTRACT

A combined power and audio dock for a handheld electronic device provides an integrated solution to the multiple uses of multifunction devices such as mobile telephones with built-in music players. The dock is configured with a recess into which the handheld device is docked so that all four exterior edges of the device are surrounded by the dock. This enables the dock to engage with any controls, jacks and ports along any edge of the device, and includes loudspeakers that can amplify the audio output of the device. The device is docked in an intentional assembly sequence that enables power and audio connectors to engage corresponding jacks on common, adjacent or opposing edges of the handheld device. Removal is accomplished in a reverse sequence.

23 Claims, 7 Drawing Sheets

COMBINED POWER AND AUDIO DOCK FOR HANDHELD DEVICE

RELATED APPLICATIONS

This application claims priority of Patent Provisional Application Ser. No. 60/891,126, titled COMBINED POWER AND AUDIO DOCK FOR HANDHELD DEVICE and filed on Feb. 22, 2007, which application is incorporated by reference in its entirety in this application.

BACKGROUND

1. Field of the Invention

The invention relates to handheld electronic devices, and more particularly, to apparatuses for providing power and audio resources for a handheld electronic device.

2. Related Art

Handheld electronic devices such as handheld audio players, PDA's and mobile telephones are being offered with many new features. The features on mobile telephones have evolved beyond simple telephonic communication to become all encompassing mobile devices that include PDA functions such as contact lists, calendars, alarms, and tools and entertainment such as cameras, games, video players and music players. Integrated music players typically play music files in mp3, wma, wav formats or other similar formats. Like all portable music players, the music files are either downloaded from the internet or uploaded from a computer or other device. When a user wants to listen to music that is stored on the mobile telephone without having to use earphones, an external loudspeaker may be used to generate audible audio output from the telephone. The mobile telephone's earphone jack may be connected to a set of loudspeakers either directly or through a tuner. This may be satisfactory in a home or office environment, but to an increasingly mobile society, a portable external loudspeaker is more desirable.

With the proliferation of features on mobile telephones, fitting access to the increasing number of features on the limited real estate available on increasingly smaller mobile phones becomes an ergonomic challenge. Placement of controls, remote sensors, power input, and input and output jacks on the telephone body is carefully engineered for usability as well as integration with the internal architecture of the device. Currently there is no uniform standard or convention for placement of these features. Peripheral devices are typically designed for specific product lines and often for particular models of mobile telephone.

Typical prior art charging stations for mobile telephones are cradle-type devices that retain a bottom portion of the telephone so that the telephone is in a vertical orientation with the top portion unencumbered. They are simply insertion devices having a mating connector to a telephone's power charging port. This configuration assumes that the charging port is located along the bottom edge of the telephone. This is not always the case as these positions vary. Prior telephone cradles typically only provide power charging capabilities.

Since use of the music or video player feature on the telephone requires the user to be able to view the display frequently if not constantly, it would be desirable to provide a dock for the telephone that connects to the earphone or audio-out jack on the telephone. A dock would position the display of the telephone for viewing either on a surface or for hand-held use. With a dock, it would be desirable to provide external loudspeakers to amplify the volume of the audio output. As long as the telephone is docked, it would also be desirable to re-charge the battery on the telephone.

There is a need for a telephone dock that can provide the functions described above by engaging the power charging port and the earphone or audio-out jack at the same time. One of the challenges to providing these functions in a dock is that the power charging port and the earphone or audio-out jack may be on opposite edges of the telephone, or on adjacent edges at 90° from one another. In those configurations, an insertion type of dock cannot couple to both ports simultaneously.

SUMMARY

In view of the above, a dock is provided for a handheld electronic device. A loudspeaker is mounted on a surface of the dock. A plurality of sidewalls defines a recess on the surface of the dock. The recess is adapted to receive and surround the handheld electronic device when docked. A floor is adapted in the recess to support the handheld electronic device when docked. The floor includes a fixed floor portion and a movable ramp portion. A pivot line is defined between the fixed floor portion and the movable ramp portion. A first electrical connector is provided along one of the sidewalls and adapted to engage a first jack of the handheld electronic device when docked. A lock is provided along one of the sidewalls and operatively coupled to the ramp portion. The lock includes a second electrical connector adapted to engage a second jack of the handheld electronic device when docked.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Example implementations of the invention can be better understood with reference to the following drawings and description. The components in the figures are not necessarily to scale, emphasis instead being placed upon illustrating the principles of the invention. In the drawings.

DETAILED DESCRIPTION

Figure 1:
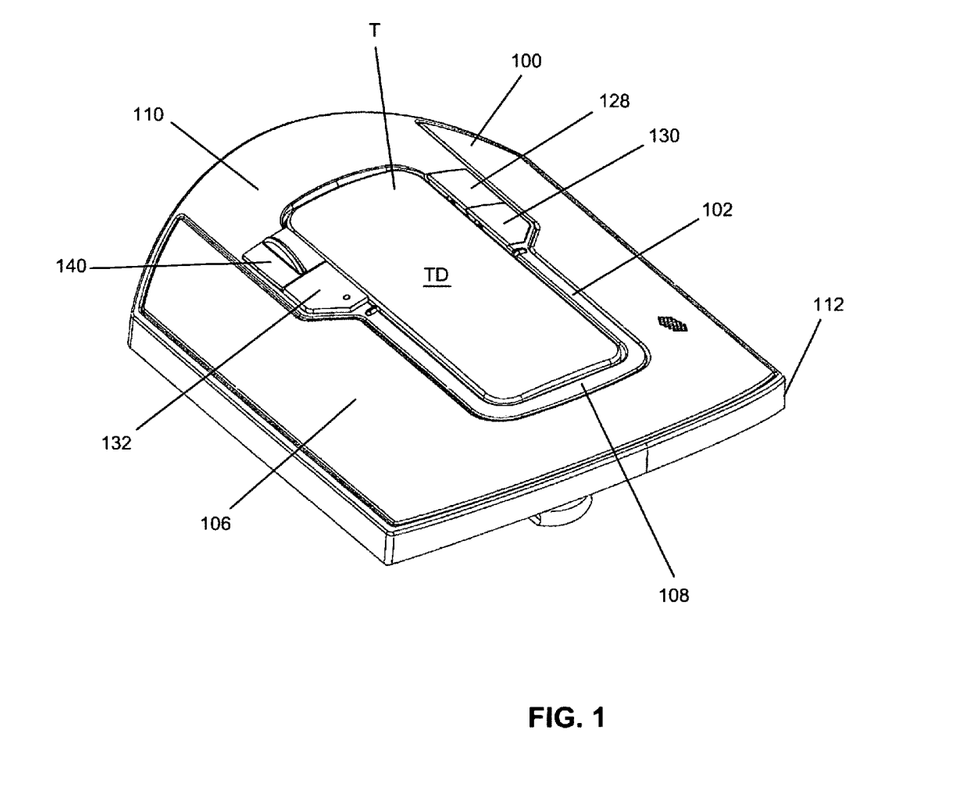
FIG. 1 is a perspective view of a combined power and audio dock for a mobile telephone shown with a telephone in the docked position.

FIG. 1 is a perspective view of a combined power and audio dock 100 for a mobile telephone shown with a mobile telephone T in the docked position. The dock 100 provides a handheld device, such as the mobile telephone T, with both power charging or auxiliary power capabilities and integrated loudspeakers for amplifying and enhancing the audio experience from the speaker phone or music player or other audio-based functions incorporated in the mobile telephone T. The dock 100 includes a docking recess 102 into which the mobile telephone T is inserted. In the example shown in FIG. 1, the mobile telephone T has a rectangular shape that is generally common for mobile telephones, and the recess 102 has a substantially similar shape to receive and substantially surround the mobile telephone T when docked. Other example docks may have recesses adapted to fit mobile telephones having other shapes. The recess 102 may also have a different shape than the mobile telephone.

The depth of the recess 102 may be adapted to correspond generally to the thickness of the mobile telephone T so that the top surface of the dock and the top surface of the mobile telephone T are substantially flush when the mobile telephone T is docked, and all edges of the mobile telephone T register with the corresponding edges of the recess 102. The recess 102 is substantially surrounded by an area covered by a mesh 106 under which one or more loudspeakers may be mounted (as discussed below with reference to FIGS. 2A-2C). On the top surface, flush with the mesh 106 is a lip 108 defining the area of the recess 102. An expanded portion 110 of the lip 108 includes space for indicia and one or more dock controls that engage the docked handheld device as described below. For example, the expanded portion 110 of the lip 108 in FIG. 1 includes volume controls 128 and 130, a mute button 132, and a slide lock mechanism 140, which are described further below with reference to FIGS. 2A-2C.

The expanded portion 110 in FIG. 1 extends at an upper portion of the lip 108 (where the mesh 106 covers the side and lower areas of the surface of the dock 100). However, the expanded portion 110 may be disposed on any side or sides of lip 108. In addition, an outer flange 112 surrounds and frames the mesh 106 area, and is also flush with the mesh area 106. When a telephone or other device is docked, the face of the telephone or device will generally be flush with the upper surface of the dock 100 including the mesh 106 area, the lip 108 and the outer flange 112. Having the telephone or device flush with the upper surface of the dock 100 provides a clean aesthetic appearance as well as a snag and catch free front surface.

The dock 100 shown in FIG. 1 provides integrated amplified audio features and power features. By inserting the mobile telephone T into the recess 102, the user employs one discrete device that serves these functions in a clean, compact, and transportable form. The audio features include built-in loudspeakers to amplify the sound of the built-in music player or a speaker phone feature. The loudspeakers enable the user to broadcast his/her music playlist to nearby listeners, an increasingly popular way to play audio files. It is also possible to use the dock 100 as a stationary device on a desk top or mounted to a wall to charge the mobile telephone T, play audio files or view video and/or photographs on a device display.

Structurally, the dock 100 provides the multiple functions with the recess 102 into which the mobile telephone T is docked. The recess 102 is adapted to receive the mobile telephone T in a particular assembly sequence so that the power jack and the audio jack of the telephone are both engaged by the dock 100. In some example implementations such as the one described below with reference to FIGS. 2A-2C, the power and audio jacks of the mobile telephone T are on edges that are 90° from one another. In other example implementations, telephones or handheld devices have these jacks disposed on opposing edges. Those of ordinary skill in the art will appreciate that the example assembly sequence illustrated by FIGS. 2A-2C may vary according to the specific structure of the dock.

Figure 2A:
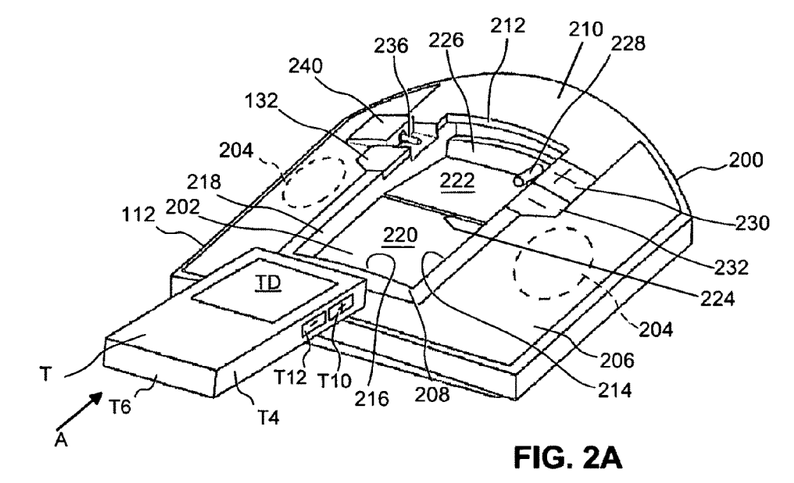
FIG. 2A is a schematic perspective view of an example dock shown with a mobile telephone detached.
Figure 2B:
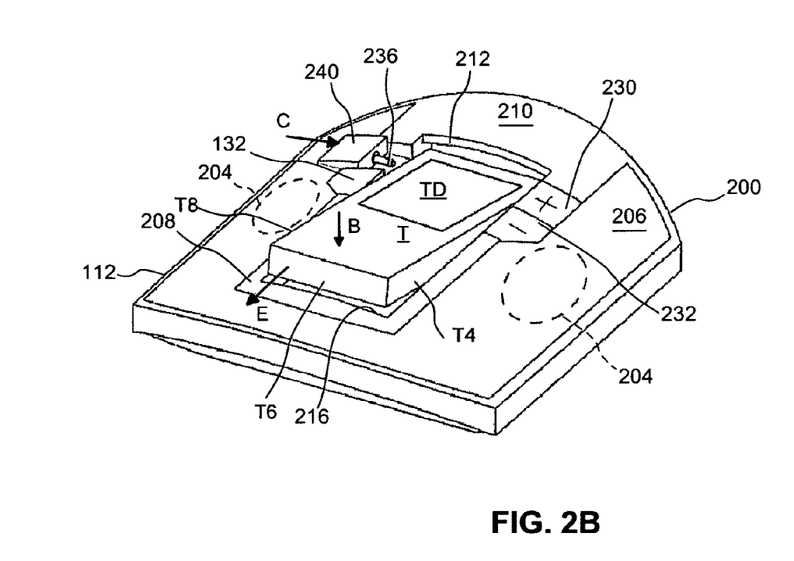
FIG. 2B is a schematic perspective view of the dock in FIG. 2A with the mobile telephone partially docked.
Figure 2C:
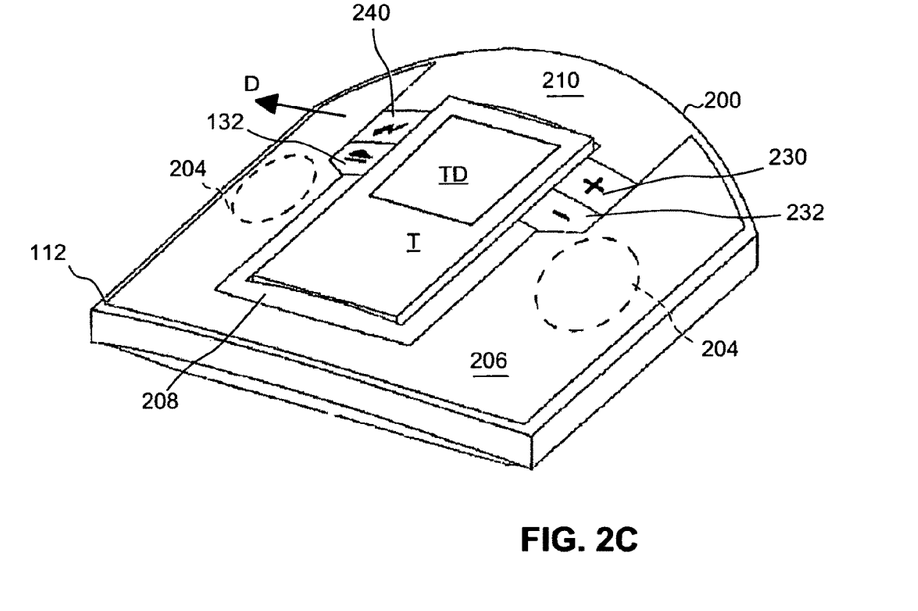
FIG. 2C is a schematic perspective view of the dock of FIGS. 2A and 2B showing the dock with the mobile telephone docked.

FIGS. 2A-2C illustrate an example assembly sequence that may be implemented in an example dock 200 similar to the dock 100 in FIG. 1. Each of FIGS. 2A-2C illustrate the state of the dock 200 and mobile telephone T as the assembly sequence proceeds. FIG. 2A is a schematic perspective view of an example dock shown with a mobile telephone detached. FIG. 2B is a schematic perspective view of the dock in FIG. 2A with the mobile telephone partially docked. FIG. 2C is a schematic perspective view of the dock of FIGS. 2A and 2B showing the dock with the mobile telephone docked. Other assembly sequences may include more or fewer stages or steps in the sequence.

As shown in FIG. 2A, the dock 200 includes a recess 202 having sidewalls 212, 214, 216 and 218 that define the shape of the recess 202, and a floor with a fixed portion 220 and a movable ramp portion 222. A pivot line 224 is formed between the fixed floor 220 and the ramp 222. The ramp 222 has a retaining lip 226 at a forward edge such that when the ramp 222 is flush with the fixed floor portion 220, the retaining lip 226 cooperates with the sidewall 212 to provide a complete supporting wall at the top edge of the recess 202. The structure of the recess 202 may receive the mobile telephone T such that edges T2, T4, T6 and T8 of the mobile telephone T register with sidewalls 212, 214, 216 and 218, respectively, when docked with the front face of the mobile telephone T facing upward such that display TD is visible. The rear face of the mobile telephone T may be in contact with the floor 220 and ramp portion 222 when docked. For explanation purposes, the mobile telephone T in FIG. 2A includes an audio jack (not shown) along top edge T2 and a power jack (not shown) along side edge T8. The dock 200 for the mobile telephone T may include an audio connector 228 disposed along the top sidewall 212, and a power connector 236 may be disposed along the sidewall 218. The positions of audio connector 228 and power connector 236 may be adapted to register with the audio jack and power jack of the mobile telephone T when docked.

The dock 200 may also be configured with additional controls that register with controls on the mobile telephone T. For example, in the illustrated example, the mobile telephone T has volume level controls T10 and T12 disposed along edge T4. Sidewall 214 of the recess 202 includes corresponding volume level controls switches 230 and 232, which are placed to register with telephone controls T10 and T12 when the mobile telephone T is docked. The top surfaces of switches 230 and 232 are integrated in expanded portion 210 of lip 208 so that they are part of the overall flush face of the dock when a telephone is docked in the recess.

Figure 3:
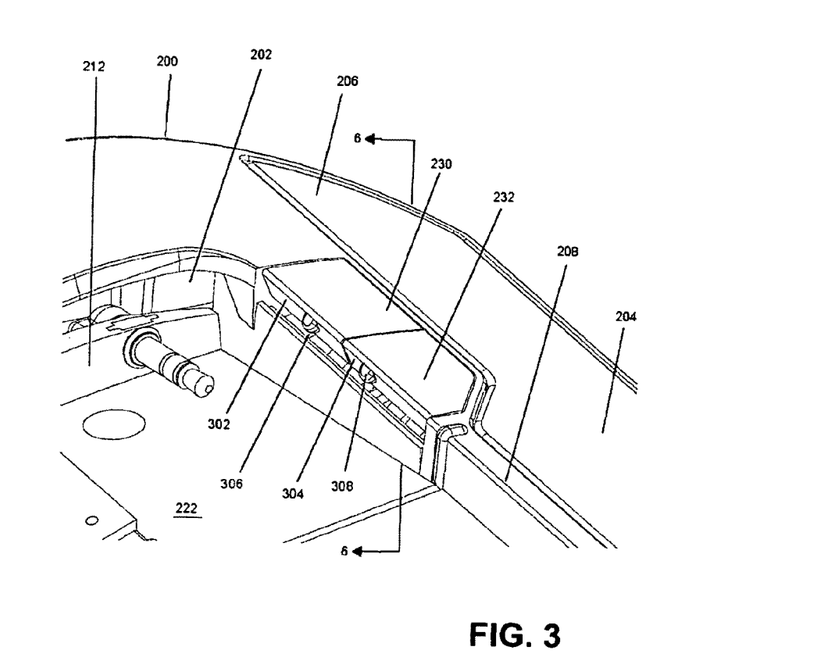
FIG. 3 is a detailed schematic perspective view of a portion of an interior edge of the dock recess showing dock controls that register with corresponding telephone controls.
Figure 4:
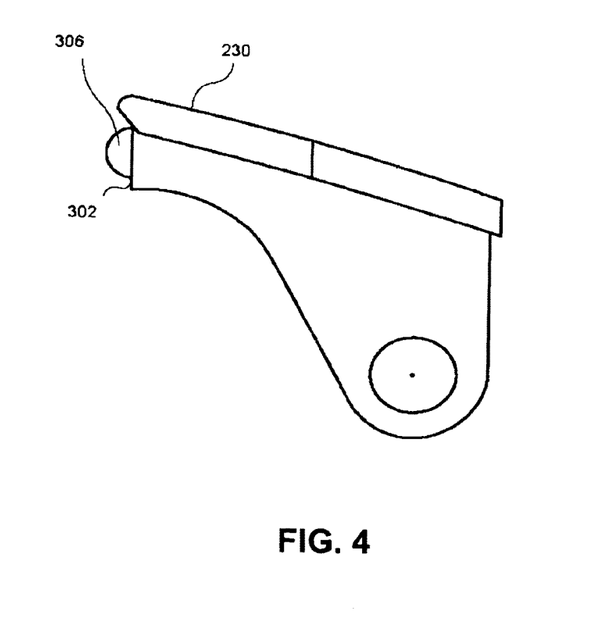
FIG. 4 is a cross-sectional view taken along line 4-4 of FIG. 3.

A detailed view of the pertinent portion of sidewall 214 is shown in FIGS. 3-4, which show that each switch 230 and 232 has a vertical portion 302 and 304 respectively, that form a portion of sidewall 214. Vertical portions 302 and 304 are located proximate to volume controls T10 and T12 of the mobile telephone T when docked, and each vertical portion 302 and 304 has integrally formed on it a protuberance or nub 306 and 308 respectively, which actuates volume control T10 or T12, respectively, when switches 230 or 232 are depressed. Switches 230 and 232 in FIGS. 2A-2C are push-buttons that may be biased by spring action or the like to the rest position flush with the top surface of the dock. This provides the user with a way to control the volume without removing the mobile telephone T or handheld device from the dock; thus extending the volume controls of the mobile telephone T.

Although volume controls are described with reference to FIGS. 2A-2C, other types of controls that could be placed along the edges of the mobile telephone T may be extended with corresponding switches on the dock 200. Examples of such other types controls include a speakerphone on/off button; an on/off button for answering the mobile telephone T or hanging up; a contrast control for the display; a ringer on/off button; playlist or display scrolling controls such as next or previous; or other similar controls. For example, in the example shown in FIG. 2A, a mute button 250 is located along left sidewall 218 of the recess 202 for registration and engagement with a correspondingly placed mute control on the mobile telephone T.

In the examples illustrated in FIGS. 1-2C, the dock 100 and its docking recess 102 are adapted to leave the entire front face of mobile telephone T visible and accessible to the user. This permits the numeric keypad and any other function controls that may be on the front face to be accessible for use when the mobile telephone T is docked.

Handheld devices such as the mobile telephone T that have audio and power jacks located on more than one edge of the device are not typically associated with a dock for either providing power or functional resources. In example implementations described here with reference to FIGS. 1-8C, features on the example dock enable a handheld device to be sequentially assembled onto the dock. An example of a sequential assembly is described with reference to FIGS. 2A-2C. In FIG. 2A, the mobile telephone T is placed into dock 200 by lining up top edge T2 with the corresponding top sidewall 212 of the recess 202 and moving the mobile telephone T into the direction of arrow A. This motion places the rear face of mobile telephone T onto ramp 222 of the recess 202. The ramp 222 instructs the movement of the mobile telephone T in an angled manner so that upper edge T2 comes into contact with upper wall 212 of recess 202 as shown in FIG. 2B. This contact involves the reception of audio connector 228 into the audio jack of the mobile telephone T. As shown in FIG. 2B, the mobile telephone T comes to rest at an angled orientation with respect to the top surface of the dock 200. The next step in the assembly sequence is to push downward on the lower portion of mobile telephone T in the direction of arrow A. Because the upper edge T2 of mobile telephone T and the upper edge 212 of the recess 202 are in contact by engagement of audio connector 228 in the audio jack, this downward motion on the lower half of the mobile telephone T pivots at the support ramp 222 so that the mobile telephone T is substantially flush with fixed floor portion 220 of the recess 202, and the bottom face of the mobile telephone T is fully supported by the fixed floor 220 and the ramp 222 when docked. The top surface of the mobile telephone T is substantially flush with the top surface of dock 200. The last step of the assembly sequence is to slide the locking mechanism 240 into place in the direction of arrow C in FIG. 2B. The lock 240 is disposed along a wall of the recess 202 and carries on it the power connector 236, which is located to register with a power jack on the mobile telephone T. As shown in FIG. 2B, the lock 240 is located along the left sidewall 218 of the recess 202 because the power jack (not shown) of mobile telephone T is disposed in a corresponding location along left edge T8. As shown in FIG. 2C, the mobile telephone T is docked in the recess 202 with its edges completely surrounded and its audio connector and power connector both engaged by respective jacks.

Removal of mobile telephone T occurs in a reverse sequence. The lock 240 may be slid outward in the direction of arrow D in FIG. 2C. This removes the power connector 236 from the power jack of the mobile telephone T and, via an internal mechanical connection, simultaneously causes the support ramp 222 to pivot downward, which moves the mobile telephone T into an angled position so that the lower portion of the mobile telephone T is not supported on fixed floor 220. This motion makes the lower portion of the mobile telephone T and its edges accessible to a user for removal of the mobile telephone T in the direction of arrow E in FIG. 2B.

The moving parts of dock 200, such as for example, the support ramp 222 and lock 240 are operably coupled to one another by any suitable internal structure, and also may be biased into a suitable position to facilitate either docking or removal of the handheld device. In addition, any of the biasing mechanisms may include mechanical damping features which actuate when the mechanisms are released to provide smooth movement of the handheld device. The scale of the dock and any mating handheld device is such that the range of movements illustrated in FIGS. 2A-2C are relatively small and damping may not be required.

In the example shown in FIGS. 2A-2C, the support ramp 222 is biased to the downward, inclined position, and is internally coupled to lock 240 such that movement of lock 240 toward mobile telephone T, in the direction of arrow D, releases support ramp 222 into its rest position. This is the motion that enables mobile telephone T to be removed by grasping its exposed lower portion.

Although the example shown in FIGS. 2A-2C shows a dock with a recess having an outline that closely matches the shape of the handheld device, a recess may be a universal receptor for a variety of handheld devices. This may be done by providing adjustability to the recess shape, depth and sidewalls, and the electrical connector features along the recess.

Figure 5:
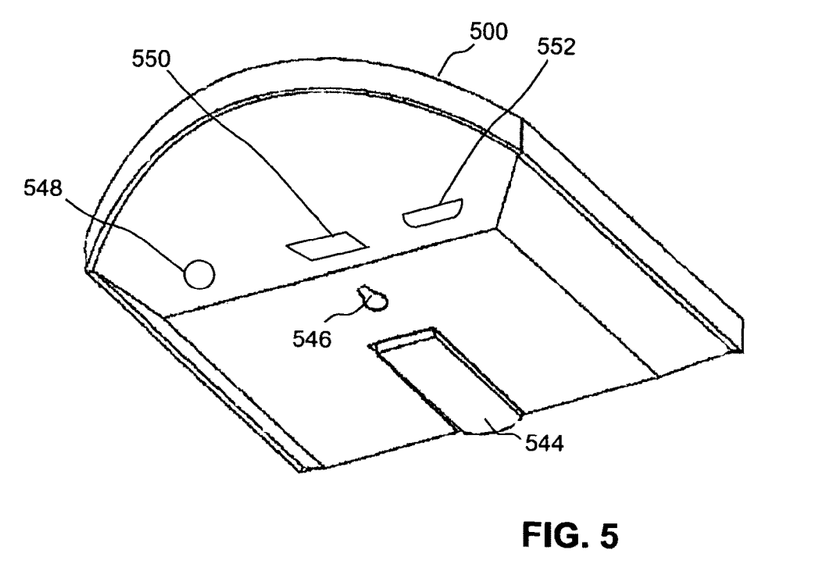
FIG. 5 is a perspective rear view of the dock showing the rear kickstand in the folded position.
Figure 6:
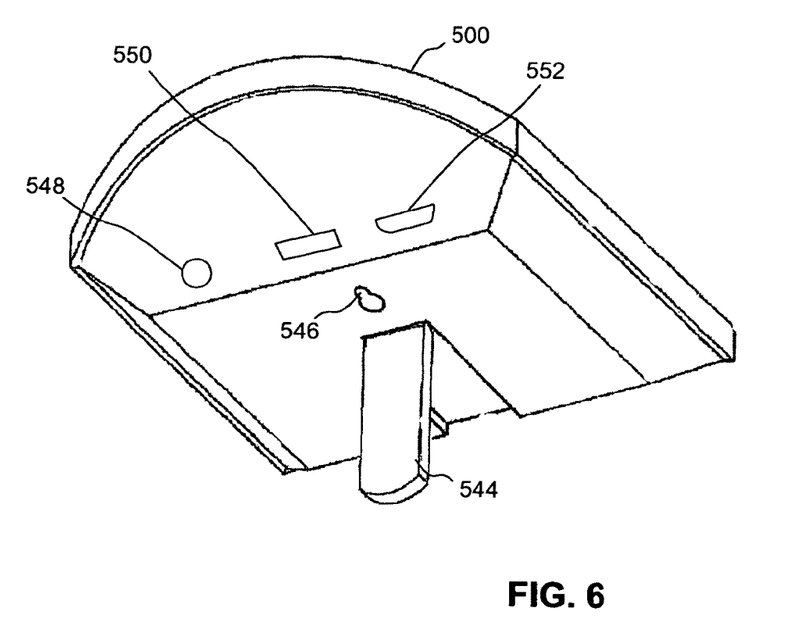
FIG. 6 is a perspective view of the dock showing the rear kickstand in the open position.
Figure 7A:
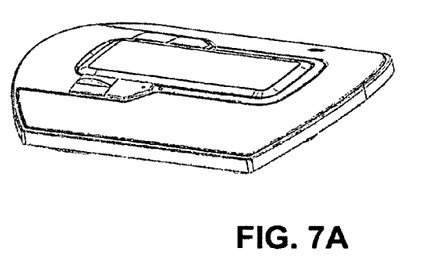
FIGS. 7A-7C are perspective views of the dock with telephone in three different use positions.
Figure 7B:
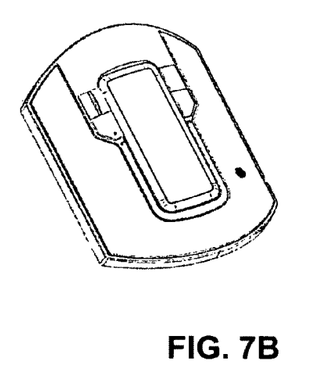
Figure 7C:
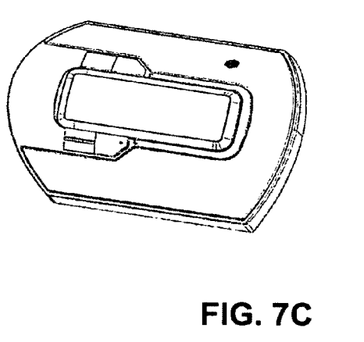

Additional features of dock 200 found on the obverse side include a kickstand 544 movable between a closed position and an open position, FIGS. 5-6. Dock 500 can be used laying flat on a horizontal surface as shown in FIG. 7A. The kickstand 544 may be opened to enable dock 500 to be positioned at an angle to a horizontal surface in either the vertical or horizontal orientations, FIGS. 7B-7C. The ability to position the dock 500 in the horizontal or vertical orientation may be particularly useful for use with handheld devices whose displays offer both portrait and landscape possibilities depending on the visual media, photographs versus video, for example. The dock 500 may also be used as a stationary device and could be mounted on a vertical surface. A keyhole 546 is provided along the rear surface in FIG. 5 to facilitate vertical mounting.

Depending on the type of handheld device to be used with the dock 500, multiple connectivity and power options may be implemented. The dock 500 has an onboard rechargeable battery contained in the housing which can either charge the handheld device or provide auxiliary power. The dock 500 may include a power jack 548 for recharging the dock 500 or operating the dock 500 with AC power in any suitable location. FIGS. 5 and 6 show one example location for the power jack 549. Additional jacks and connectors may be provided on the dock 500 such as a standard USB connector 550 and a pin connector 552 such as a mini-USB or proprietary device.

Figure 8A:
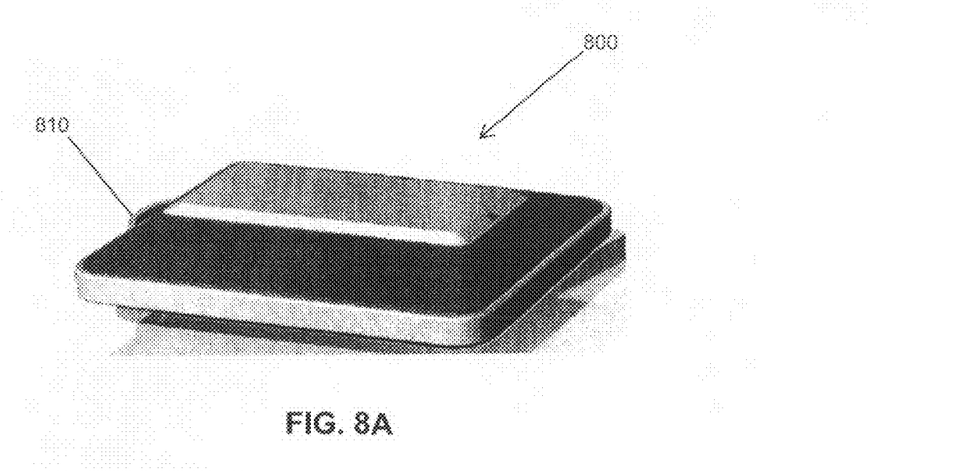
FIGS. 8A-8C are perspective views of other examples of the dock with telephone in three different use positions.
Figure 8B:
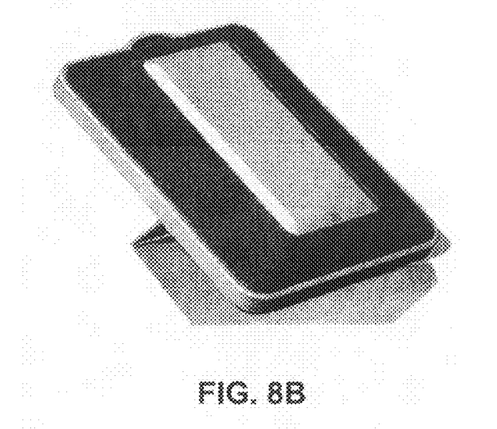
Figure 8C:
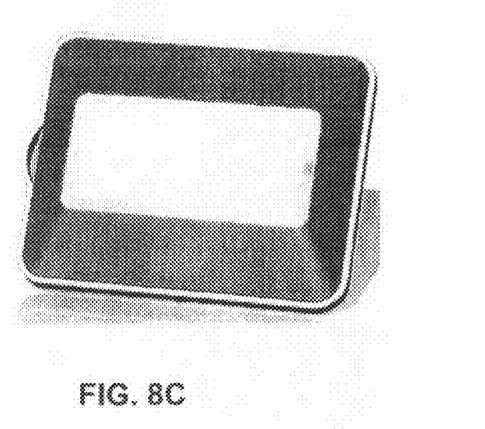

FIGS. 8A-8C illustrate an example of a dock 800 in three use orientations with a handheld device docked therein. The controls and lock could be located along any of the four walls of the recess to register with the necessary controls of the handheld device. The dock 800 in FIGS. 8A-8C includes an integrated loop 810 on the top edge of the dock 800 for connecting to a leash or the like.

Although the examples described show the audio connector on the upper wall of the recess, and the power connector and lock along a side wall of the recess placed on adjacent walls at 90° from one another, examples of docks that mate with any configuration of jacks on a handheld device. For example, the audio connector and power connector in the illustrated example could be switched. It is also possible that the audio and power connectors be placed along the same wall of the recess to mate with a device configured in like manner. It is also possible that the audio and power connectors be placed on opposing walls of the recess with the support ramp pivoting in a different direction to accommodate any such docking relationship.

Example implementations are described here for use with a mobile telephone, but it will be understood that example docks may be used with any suitable handheld device such as a music player, a video player, a game, PDA or the like. For purposes of this disclosure, anytime reference is made to a mobile telephone, it will be understood that this is for convenience of description only and does not limit the scope of the claims.

The foregoing description of an implementation has been presented for purposes of illustration and description. It is not exhaustive and does not limit the claimed inventions to the precise form disclosed. Modifications and variations are possible in light of the above description or may be acquired from practicing the invention. Note also that the implementation may vary between systems. The claims and their equivalents define the scope of the invention.

What is claimed is:

1. A dock for a handheld electronic device comprising:
    a loudspeaker mounted on a surface of the dock;
    a recess on the surface defined by a plurality of sidewalls and adapted to receive and surround the handheld electronic device when docked, the recess comprising:
    a floor adapted to support the handheld electronic device when docked, the floor having a fixed floor portion and a movable ramp portion defining a pivot line between the fixed floor portion and the movable ramp portion;
    a first electrical connector provided along one of the sidewalls and adapted to engage a first jack of the handheld electronic device when docked;
    a lock provided along one of the sidewalls and operatively coupled to the ramp portion, the lock carrying a second electrical connector adapted to engage a second jack of the handheld electronic device when docked.

2. The dock of claim 1 where:
    the first electrical connector and the second electrical connector are disposed along a common sidewall;
    the first electrical connector is an audio connector; and
    the second electrical connector is a power connector.

3. The dock of claim 2 further comprising a switch disposed along one of the sidewalls adapted to register with a corresponding control along an edge of the handheld electronic device.

4. The dock of claim 3 where the switch includes a protuberance on a vertical portion of the recess sidewall adapted to actuate the corresponding control on the handheld electronic device.

5. The dock of claim 1 where:
    the first electrical connector and the second electrical connector are disposed along adjacent sidewalls;
    the first electrical connector is an audio connector; and
    the second electrical connector is a power connector.

6. The dock of claim 5 further comprising a switch disposed along one of the sidewalls adapted to register with a corresponding control along an edge of the handheld electronic device.

7. The dock of claim 6 where the switch includes a protuberance on a vertical portion of the recess sidewall adapted to actuate the corresponding control on the handheld electronic device.

8. The dock of claim 1 where:
    the first electrical connector and the second electrical connector are disposed along opposing sidewalls;
    the first electrical connector is an audio connector; and
    the second electrical connector is a power connector.

9. The dock of claim 8 further comprising a switch disposed along one of the sidewalls adapted to register with a corresponding control along an edge of the handheld electronic device.

10. The dock of claim 9 where the switch includes a protuberance on a vertical portion of the recess sidewall adapted to actuate the corresponding control on the handheld electronic device.

11. The dock of claim 1 further comprising a kickstand on an obverse surface.

12. The dock of claim 1 further comprising a keyhole on an obverse surface.

13. The dock of claim 1 where the floor is movable to adjust the depth of the recess, and at least one of the sidewalls is movable to adjust the shape and size of the recess.

14. A dock configured to dock a mating handheld electronic device in an assembly sequence and provide for removal of same in a removal sequence, the dock comprising:
    a loudspeaker mounted on a surface of the dock;
    a recess in the surface having a depth determined by a thickness of the mating handheld electronic device and defined by a plurality of sidewalls, the recess adapted to receive and surround all edges of the handheld electronic device when docked, the recess comprising:
    a floor adapted to support the handheld electronic device when docked, the floor having a fixed floor portion and a ramp portion movable between a flat position flush with the fixed floor portion and an inclined position, the fixed floor portion and the ramp portion defining a pivot line between the fixed floor portion and the ramp portion, the ramp portion biased in the inclined position;
    a first electrical connector provided along one of the sidewalls and adapted to engage a first jack of the handheld electronic device when docked;
    a slidable lock movable between an inward docked and locked position and an outward unlocked and removal position, the lock provided along one of the sidewalls and carrying a second electrical connector adapted to engage a second jack of the handheld electronic device when docked and locked where the first electrical connector is an audio connector and the second electrical connector is a power connector; and
    where the lock and the ramp portion are operatively coupled to one another such that sliding the lock into the outward removal position releases the ramp portion into the inclined position.

15. The dock of claim 14 where the first electrical connector and the second electrical connector are disposed along adjacent sidewalls.

16. The dock of claim 15 further comprising a switch disposed along a sidewall adapted to register with a corresponding control along an edge of the handheld electronic device.

17. The dock of claim 16 where the switch includes a protuberance on a vertical portion of the recess sidewall adapted to actuate the corresponding control on the handheld electronic device.

18. The dock of claim 14 where the first electrical connector and the second electrical connector are disposed along opposing sidewalls.

19. The dock of claim 18 further comprising a switch disposed along one of the sidewalls adapted to register with a corresponding control along an edge of the handheld electronic device.

20. The dock of claim 19 where the switch includes a protuberance on a vertical portion of the recess sidewall adapted to actuate the corresponding control on the handheld electronic device.

21. The dock of claim 14 further comprising a kickstand on an obverse surface.

22. The dock of claim 14 further comprising a keyhole on an obverse surface.

23. The dock of claim 14 where the floor is movable to adjust the depth of the recess, and at least one of the sidewalls is movable to adjust the shape and size of the recess.

* * * * *